Aug. 4, 1936.  G. D. JOHNSON  2,049,450
EXPANSIBLE CUTTER TOOL
Filed Aug. 23, 1933
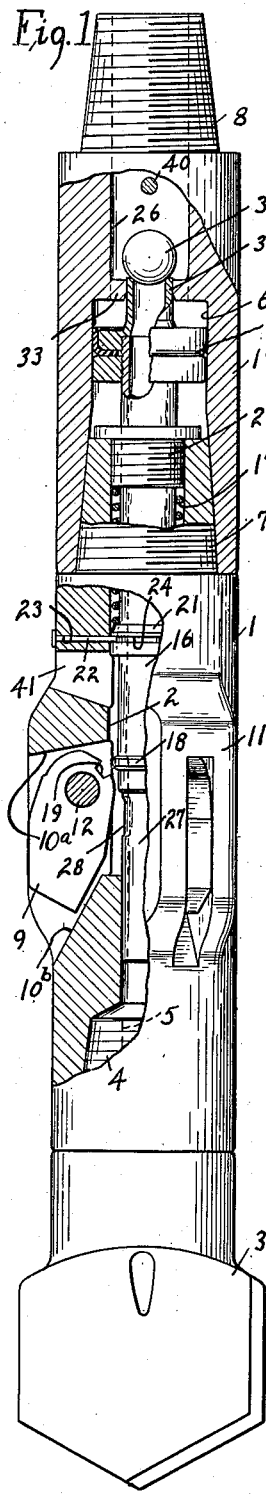
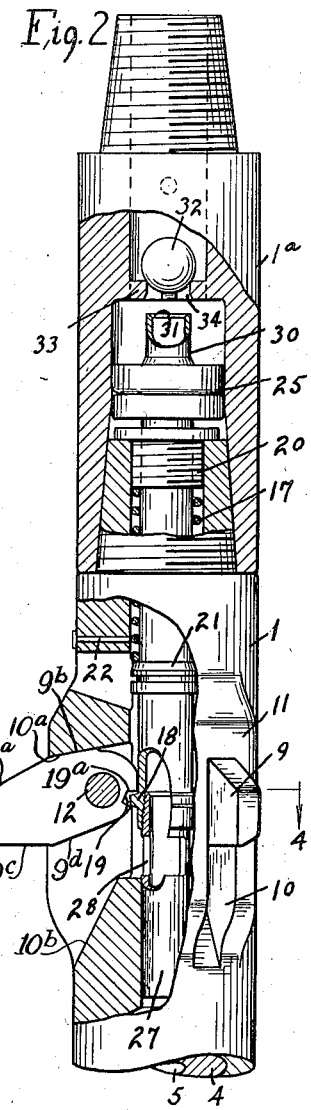
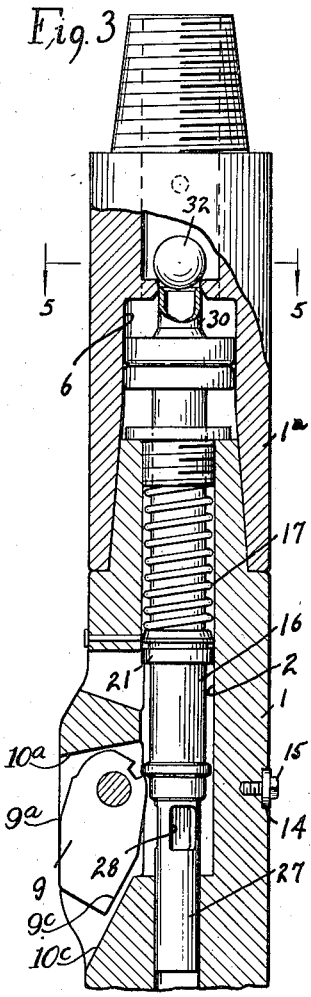
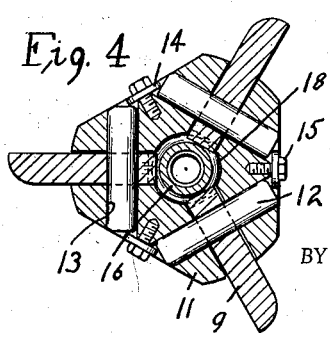
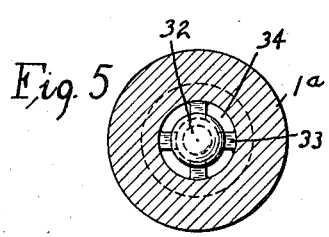
INVENTOR.
GLENN D. JOHNSON
BY
ATTORNEY.

Patented Aug. 4, 1936

2,049,450

UNITED STATES PATENT OFFICE 2,049,450

EXPANSIBLE CUTTER TOOL

Glenn D. Johnson, Compton, Calif., assignor, by mesne assignments, to MacClatchie Manufacturing Company, Compton, Calif., a corporation of California Application August 23, 1933, Serial No. 686,379

12 Claims. (Cl. 255—76)

This invention is an expansible cutter tool; and has for one object to provide a tool having a normally contracted cutter, adapted to be expanded by an actuating means which is normally inoperative but which is adapted for release by a hydraulic control so as to expand the cutter by the actuating means.

It is a further object of the invention to simplify the construction and provide a sturdy and fool-proof structure, with no possibility of accidental release of the actuating means until pressure is applied to the hydraulic control.

It is a further object of the invention to completely shut-off the bore of the tool for building up pressure to operate the hydraulic control and thus release the actuating means for operative movement to expand the cutter, with said operative movement of the actuating means adapted to then open the bore of the tool for circulation during the reaming operation of the expanded cutter, and the bore of the tool remaining open during subsequent contraction of the cutter while withdrawing the tool from a well.

It is a still further object of the invention to adapt a cutter for operative expansion through direct impingement by a mandrel which is longitudinally shifted by an actuating means, with the construction providing for convenient assembly of at least three equi-distantly circumferentially spaced cutters so as to insure cutting a true circular bore, and the cutters comprising blades which are adapted for vertical swinging to operative position, and which when expanded are adapted for longitudinal thrust against the body of the tool and lateral thrust against pivot pins upon which the blades are respectively mounted.

Further objects of the invention will be readily understood from the following description of the accompanying drawing, in which:

Fig. 1 is a side elevation of the tool, partly in axial section, and showing the cutter blades in normal contracted position while lowering the tool into a well.

Fig. 2 is a similar view, showing the blades operatively expanded.

Fig. 3 is a similar view, showing contraction of the blades during withdrawal of the tool from the well.

Fig. 4 is a transverse section on the line 4—4 of Fig. 2.

Fig. 5 is a transverse section on the line 5—5 of Fig. 3.

The construction embodying the invention is shown as including a cutter support and a cylinder for a hydraulic control, with said elements forming a fixed section of a drill string. The cutter support comprises a body 1 having a bore 2, and a bit 3 is adapted for suspension from the body, as for example by a usual threaded connection 4, with the bore 5 of the bit communicating with the bore 2. For convenience of assembly the cylinder 6 for the hydraulic control is preferably formed in a sub 1a which is detachably mounted on body 1 by means of a usual threaded connection 7; and the cylinder sub is adapted for suspension from a usual tool string (not shown), as for example by a threaded pin 8.

The body 1 is adapted to support a plurality of cutters, which may comprise at least three equidistantly spaced cutters so as to insure cutting a true circular bore. For this purpose the cutters, which are shown as blades 9, are respectively mounted in radial slots 10 in the body 1, with the periphery of the body preferably radially bulged at each slot as shown at 11 so as to insure a sturdy construction. The cutter blades are shown pivoted on pins 12 so that they are adapted to swing downwardly into the slots 10 for contraction within the body of the tool, or are adapted to be swung outwardly and upwardly for operative expansion projecting radially from the body. When the blades are expanded, as shown at Fig. 2, the upper ends of slots 10 are engaged by the blades so as to take longitudinal thrust, and the pivot pins 12 take the lateral thrust. The pivot pins may be mounted in bores 13 which open transversely through the respective bulges 11, with the pins removably held in place by washers 14 engaging the proximate ends of adjacent pins as shown at Fig. 4, with the washers bolted on body 1 as shown at 15.

The cutter blades are swung to operative position by a common actuating means, which is shown as a mandrel 16 slidable in bore 2 and having a spring 17 tending to depress the mandrel. The slots 10 open into bore 2, and a collar 18 is formed on the mandrel and is adapted to engage cooperating notches 19 in the blades 9 when the mandrel is depressed, so that downward movement of the mandrel swings the blades from the position shown at Fig. 1 to that shown at Fig. 2, and during subsequent withdrawal of the tool the blades are free to swing downwardly into slots 10, by elevating the mandrel from the position shown at Fig. 2 to that shown at Fig. 3. The spring 17 encircles the upper portion of the mandrel and is received in the upper portion of bore 2, with a bushing 20 threaded into the upper end of the bore and forming an abutment for the upper end of the spring, and a collar 21 on the mandrel forms an abutment for the lower end of the spring.

In the illustrated embodiment of the invention, the mandrel 16 is normally held in elevated position against the action of its spring, so that the cutter blades are free to contract as shown at Fig. 1; and a hydraulic control is adapted to release the mandrel so that the spring 17 may depress the mandrel for expanding the cutters. As an instance of this arrangement a shear pin 22 is mounted in a radial bore 23 in body 1 and extends into a groove 24 in the collar 21, thereby normally locking the mandrel against movement; and when the cutter blades are to be expanded hydraulic pressure is developed in cylinder 6 and is exerted against the mandrel for shearing-off the pin 22 so that the mandrel is free for operative depression by its spring 17.

For the purpose of such hydraulic control, the upper end of mandrel 16 projects through the bushing 20 into the cylinder 6, and a piston 25 is fixed on the mandrel and is adapted for fluid tight sliding fit in the cylinder. The upper end of the cylinder communicates with a bore 26 which opens through the upper end of the sub 1ª, and which is in turn adapted for communication with the circulating bore of the tool string from which the under-reamer is suspended; and when the cutter blades are to be expanded fluid is pumped downwardly through the bore of the drill string and thence through the bore 26 into the cylinder 6, thereby building up pressure in the cylinder for depressing the piston 25 and the mandrel 16, so as to shear off the pin 22 and thus release the mandrel for actuation by its spring 17.

Means are provided whereby the fluid from the bore of the drill string is adapted for circulation past the cutters when they have been operatively expanded; and for this purpose the mandrel 16 has a bore opening therethrough, and a wash pipe 27 having an open bore is suspended from the mandrel and has lateral outlet ports 28 below the respective cutter blades. After the fluid which is pumped through the bore of the drill string has built up pressure in cylinder 6 for operating the hydraulic control, the fluid is permitted to flow through the bore of mandrel 16 and thence through wash pipe 27. A part of the fluid is discharged at the ports 28 adjacent the cutting edges of the expanded blades, and the remainder of the fluid flows from the wash pipe through the bore of bit 3, for discharge at the blades of the bit in accordance with usual practice.

As an instance of this arrangement a nipple 30 projects upwardly from piston 25 and communicates with the bore of the mandrel; but the bore of the nipple is closed to the cylinder 6 and to the bore 26 when the cutter blades are normally contracted as shown at Fig. 1, so that fluid pumped through the drill string cannot escape via the nipple but must build up pressure in cylinder 6 for releasing the actuating means to expand the cutters by longitudinal movement of the mandrel. As a result of this movement of the mandrel, the bore of nipple 30 is opened to cylinder 6 so that fluid is free to circulate through the bore of the tool. For this purpose a valve seat 31 is formed at the upper end of the bore of the nipple, and a ball valve 32 is adapted to engage this seat and close the bore of the nipple when the parts are in normal position as shown at Fig. 1, but when the mandrel and the nipple have been depressed as shown at Fig. 2, the ball valve is engaged by an abutment in the bore 26, so that it is held in spaced relation above its seat 31, thereby opening the bore of the nipple to the cylinder 6. The abutment for the ball valve is shown as a spider 33 having fluid passageways 34, whereby the bore 26 remains open to cylinder 6 both when the ball valve engages its seat and when it is supported on the spider.

In operation, the tool is run into a well on a usual drill string, with the cutters contracted as shown at Fig. 1 and the mandrel 16 held in inoperative position by the shear pin 22. The ball valve 32 is free to rise from its seat 31 so as to open the bore of the tool, the movement of the ball valve being limited by a stop pin 40. When the tool is below the well casing and at the level at which it is desired to expand the cutters, pump pressure is applied to fluid in the drill string, thereby seating the ball valve and closing the bore of nipple 30 so that fluid pressure is built up in cylinder 6. This pressure actuates piston 25 as shown at Fig. 2, so as to shear off the pin 22, thereby depressing mandrel 16 by its spring 17 for expanding the cutter blades, and unseating the ball valve 32 for circulation through the bore of the tool. The drill string is then rotated for cutting action by the expanded cutter blades. When the tool is to be withdrawn from the well the blades are contracted as shown at Fig. 3, through abutment of their upper edges against the end of the well casing, and the mandrel 16 is thus elevated slightly against the tension of its spring 17, but with the valve seat 31 still spaced from the ball valve 32 so that the bore of the tool remains open. Before the under-reamer is again run into a well, a suitable tool is inserted through a slot 41 in the body 1, for engaging the collar 21 to again elevate the mandrel 16 to a position where a new shear pin may be inserted in bore 23 for rengaging the groove 24. The actuating means for expanding the cutters is thus locked in inoperative position, until released by the hydraulic control.

The invention thus provides a simple construction whereby a plurality of cutters which are mounted on a fixed section of a drill string may be expanded through direct impingement by a mandrel which is slidable relative to the drill string, with the actuating means for the mandrel preferably normally positively locked but adapted for release by a hydraulic control; and the bore of the tool is adapted to be completely closed to insure pressure being built up for operating the hydraulic control, but when the cutters have been expanded the bore of the tool is opened for circulating a washing medium during the reaming operation, and during withdrawal of the tool its bore remains open for bleeding the drill string.

The cutters 9 and the slots 10 are preferably arranged so that the slots while of restricted size to maintain adequate body strength are adapted to receive relatively large cutters, with the contracted cutters lying substantially wholly within the slots and the expanded cutters defining a cutting radius appreciably greater than the radius of bulges 11. As an instance of this arrangement the upper end wall 10a of each slots slants outwardly and downwardly at a slight angle for a purpose hereinafter described, and the lower end wall 10b of each slot is inclined upwardly and inwardly at a relatively steep angle from the outer periphery of body 1 to the bore 2 of the body. The side edge 9a of the blade portion of each cutter forms an angular continuation of the side edge 9b of the shank of the cutter, and the opposite side edge 9c of the blade forms an annular continuation of the side edge 9d of the shank, with the side edges 9a—9c slanting toward one another and connected by a blade edge 9e.

The pivot pin 12 extends through the shank portion of the cutter adjacent its end which is remote from the projecting blade portion of the cutter, and the pivot pin is mounted in slot 10 adjacent its upper end. The shank portion of the cutter may be of appreciable width for desired strength while still providing for its complete reception within the slot 10 when the cutter is contracted and the shank portion of the cutter is received within the full width of slot 10 above its slanting lower end 10b as shown at Fig. 1. The blade portion of the cutter may also be of appreciable width to obtain desired strength of the blade and to provide a blade edge 9e of substantial length, and it may be appreciably elongated for desired length of its blade edge 9c while still providing for complete reception of the blade portion of the cutter within the lower portion of slot 10, since the angular disposition of blades edges 9a—9c adapts the blade portion of the cutter for complete reception within the tapering lower portion of slot 10 which is defined by the slanting end wall 10b as shown at Fig. 1. The steep inclination of the slanting end wall 10b insures a substantial width for said tapering lower portion of the slot along an appreciable length thereof, and thus provides for reception of a blade portion of the cutter which is of appreciable length and width. At the same time the slot 10 is maintained of restricted size so as not to unduly weaken the body of the tool. When the cutter is expanded its shank edge 9b engages the end wall 10a of the slot, the inclination of the end wall 10a being such as to horizontally position the blade edge 9c and to vertically position the blade edge 9e when the cutter is expanded as shown at Fig. 2, so that blade edge 9c provides a horizontal cutting edge projecting appreciably beyond bulge 11 and blade edge 9c provides a reaming edge of appreciable length.

When the cutters have been operatively projected they are held in expanded position by the formation pressing against the pivoted blades so that the shank edges 9b abut the end walls 10a; and with the parts in this position the collar 18 is preferably adapted for slight vertical play relative to notches 19, so that vibration of mandrel 16 resulting from pulsation of the pump which circulates the washing medium, will not cause excessive wear of the collar against the walls of the notches. For this purpose collar 18 and notches 19 are of such relative width that when the cutters are in expanded position slight clearance 19a is provided between the collar and the walls of the notches as shown at Fig. 2.

It will be noted that the cutters, while of somewhat irregular outline, have a well defined greater length than width as viewed in side elevation, with the width of each cutter defined generally by the distance between the edges 9a—9b at one side of the elongated cutter and the edges 9c—9d at its opposite side, and with the greater length of the cutter defined generally by the distance between the edge 9e at the outer end of the cutter and that edge of the cutter which is notched at 19 and which is at the inner end of the cutter at the opposite side of pivot 12. Such generally defined length of the cutter is substantially perpendicular to the longitudinal axis of the tool when the cutter is expanded as shown at Fig. 2, and extends in the general direction of the longitudinal axis of the tool when the cutter is contracted as shown at Fig. 1. In other words the cutting edge 9c is approximately parallel to the generally defined length of the cutter, so that when the cutter is in operative position with its cutting edge 9c horizontal and its cutting edge 9e vertical, the generally defined length of the cutter is approximately horizontal, i. e. perpendicular to the longitudinal axis of the tool, and when the cutter is contracted its edge 9c slants upwardly and inwardly at a steep angle, so that the lower edge 10b of the slot 10 may have a similar steep inclination and still provide a slot which will accommodate the contracted cutter. Consequently the expanded cutter provides maximum cutting gauge for its length, and the contracted cutter is received within a slot which produces only minimum weakening of the body of the tool.

I claim:

1. In combination, a hollow support having a radial slot, a cutter pivoted in the slot and adapted to swing upwardly and outwardly to expanded position leaving an unobstructed lower portion of the radial slot below the expanded cutter, and a hollow mandrel movable in the bore of the hollow support and engaging the cutter for swinging the same, the hollow mandrel being adapted for flow of drilling fluid therethrough for discharge from the lower end of the mandrel into the bore of the hollow support below the radial slot and having a lateral port in its side wall for discharge of a portion of said flow of drilling fluid, the lateral port being positioned above the lower end of the mandrel for substantial transverse alinement with said lower unobstructed portion of the radial slot when the mandrel has moved to a position expanding the cutter.

2. In combination, a hollow body, an expansible cutter, the body being of fixed length and having means for mounting it between upper and lower portions of a drill string and holding it against longitudinal movement relative to said portions of the string during expansion of the cutter, a mandrel in the hollow body, the mandrel being longitudinally movable relative to the body and the drill string for expanding the cutter, a spring tending to move the mandrel in the direction for expanding the cutter, a sheer pin cooperating with the mandrel for holding it against said movement, and means for exerting fluid pressure against the mandrel for shearing off the pin.

3. In combination, a body, an expansible cutter, the body being of fixed length and having means for mounting it between upper and lower portions of a drill string and holding it against longitudinal movement relative to said portions of the string during expansion of the cutter, actuating means longitudinally movable relative to the body and the drill string for expanding the cutter, a spring tending to move the actuating means in the direction for expanding the cutter, and means cooperating with the actuating means for holding it against said movement, said holding means being arranged whereby it may be rendered inoperative by fluid pressure in the drill string.

4. In combination, a hollow body, an expansible cutter, the body having means for suspending it from a drill string and holding it against longitudinal movement relative to the drill string during expansion of the cutter, a mandrel in the hollow body, the mandrel being longitudinally movable relative to the body and the drill string for expanding the cutter, a spring tending to move the mandrel in the direction for expanding the cutter, and means cooperating with the mandrel for holding it against said movement, said holding means being arranged whereby it may be rendered inoperative by fluid pressure in the drill string.

5. In combination, a body, an expansible cutter, the body being of fixed length and having means for mounting it between upper and lower portions of a drill string and holding it against longitudinal movement relative to said portions of the string during expansion of the cutter, actuating means longitudinally movable relative to the body and the drill string for expanding the cutter, means tending to move the actuating means in the direction for expanding the cutter, a shear pin cooperating with the actuating means for holding it against said movement, and means for exerting fluid pressure against the actuating means for shearing off the pin.

6. In combination, a hollow body, an expansible cutter, the body having means for suspending it from a drill string and holding it against longitudinal movement relative to the drill string during expansion of the cutter, a mandrel in the hollow body, the mandrel being longitudinally movable relative to the body and the drill string for expanding the cutter, means tending to move the mandrel in the direction for expanding the cutter, a shear pin cooperating with the mandrel for holding it against said movement, and means for exerting fluid pressure against the mandrel for shearing off the pin.

7. In combination, a hollow body, an expansible cutter, the body having means for suspending it from a drill string and holding it against longitudinal movement relative to the drill string during expansion of the cutter, a mandrel in the hollow body, the mandrel being longitudinally movable relative to the body and the drill string for expanding the cutter, a spring tending to move the mandrel in the direction for expanding the cutter, a shear pin cooperating with the mandrel for holding it against said movement, and means for exerting fluid pressure against the mandrel for shearing off the pin.

8. In combination, a hollow support having a radial slot, a cutter adapted for movement in the slot for expanding the cutter and leaving an unobstructed portion of the radial slot longitudinally beyond the expanded cutter, and a hollow mandrel movable in the hollow support and cooperating with the cutter for expanding the same, the hollow mandrel being adapted to receive drilling fluid and having a lateral outlet for said drilling fluid, the lateral outlet being positioned for substantially transverse discharge into said unobstructed portion of the radial slot when the mandrel is in position expanding the cutter.

9. In combination, a hollow support having a radial slot, a cutter adapted for movement in the slot for expanding the cutter, and a hollow mandrel movable in the hollow support and cooperating with the cutter for expanding the same, the hollow mandrel being adapted to receive drilling fluid and having an outlet for said drilling fluid, the outlet being positioned for direct discharge transversely into the radial slot when the mandrel is in position expanding the cutter.

10. In combination, a hollow support having a slot extending through its wall, the bottom wall of the slot slanting upwardly and inwardly at a relatively steep angle to the support axis, a cutter comprising a shank and a blade, the cutter being of generally elongated form with its side edges which define the width of its blade tapering toward the outer end of the blade and connected at their outer ends by an end cutting edge which defines the length of the cutter, one of said side edges of the blade also forming a cutting edge at the underside of the blade which is substantially parallel to the length of the cutter, and pivot means engaging the shank of the cutter remote from its blade and adjacent an edge of the shank which defines the opposite end of the length of the cutter, said means pivoting the cutter in the slot adjacent the upper end of the slot, the shank of the cutter being adapted for reception within the upper portion of the slot, and the blade of the cutter being adapted for reception within the lower tapering portion of the slot when the cutter is contracted, with the length of the cutter at a slight angle to the support axis and with the cutting edge at the underside of the blade extending along the steeply inclined bottom wall of the slot for an appreciable distance but terminating short of the end of the tapering lower portion of the slot, the cutter when expanded abutting its shank against the upper wall of the slot, with the length of the cutter approximately perpendicular to the support axis and with the cutting edge at the underside of the blade positioned substantially horizontally and projecting an appreciable distance radially beyond the support, and the cutting edge at the end of the blade being vertically disposed and forming a reaming edge of appreciable length.

11. In a reamer, a hollow support having a slot in its wall, the bottom wall of the slot slanting upwardly and inwardly, a cutter comprising a shank and a blade, the cutter being of generally elongated form, one of its side edges which define the width of the blade forming a cutting edge at the underside of the blade which is substantially parallel to the length of the cutter, one of the edges of the cutter which defines its length also forming a cutting edge at the outer end of the blade, and pivot means adjacent an edge of the shank which defines the opposite end of the length of the cutter, said means pivoting the cutter in the slot, the shank of the cutter being adapted for reception within the upper portion of the slot, and the blade of the cutter being adapted for reception within the lower tapering portion of the slot when the cutter is contracted, with the length of the cutter at a slight angle to the support axis and with the cutting edge at the underside of the blade extending along the slanting bottom wall of the slot for an appreciable distance but terminating short of the end of the tapering lower portion of the slot, the cutter when expanded abutting its shank against the upper wall of the slot, with the length of the cutter approximately perpendicular to the support axis and with the cutting edge at the underside of the blade positioned substantially horizontally and projecting an appreciable distance radially beyond the support, and the cutting edge at the end of the blade being vertically disposed and forming a reaming edge of appreciable length.

12. In a reamer, a hollow support having a slot in its wall, the bottom wall of the slot slanting upwardly and inwardly, a cutter comprising a shank and a blade, the cutter being of generally elongated form, one of its side edges which define the width of the blade forming a cutting edge at the underside of the blade which is substantially parallel to the length of the cutter, and pivot means adjacent an edge of the shank which defines the length of the cutter, said means pivoting the cutter in the slot, the shank of the cutter being adapted for reception within the upper portion of the slot, and the blade of the cutter being adapted for reception within the lower tapering portion of the slot when the cutter is contracted, with the length of the cutter at a slight angle to the support axis and with the cutting edge of the blade extending along the slanting bottom wall of the slot for an appreciable distance, the cutter, when expanded, having the length of the cutter approximately perpendicular to the support axis, with the cutting edge substantially horizontal and projecting an appreciable distance radially beyond the support.

GLENN D. JOHNSON.